Patented Mar. 2, 1954

2,671,082

UNITED STATES PATENT OFFICE 2,671,082

PREPARATION OF AROMATIC ISOCYANATE DIMERS

Otto Stallmann, Bridgeton, N. J., assignor to E. I. du Pont de Nemours and Company, Wilmington, Del., a corporation of Delaware No Drawing. Application September 25, 1951, Serial No. 248,270

14 Claims. (Cl. 260—239)

This invention relates to the formation of compounds containing a grouping which is an addition product of two isocyanate radicals and more particularly to a process for preparing such compounds from aromatic isocyanates.

Compounds containing a grouping of this type are useful as intermediates in the preparation of adhesives and other materials widely used in the textile, paper, leather, rubber and related trades. They may be prepared by reacting monomeric aromatic isocyanates in the presence of a suitable catalyst. At elevated temperatures, they decompose to give the original isocyanate monomers. A variety of catalysts have been suggested for their preparation, including trialkylphosphines, trialkylarsines, trialkylamines, oxalic esters and pyridine. Of these, only triethylphosphine and pyridine have been used with some success. Triethylphosphine has the disadvantage of being very sensitive to air oxidation, so that it may be used only under a blanket of nitrogen or other protective gas. Furthermore, triethylphosphine is a highly active catalyst, making the reaction difficult to control. If the temperature is allowed to rise without restraint, there are formed undesired higher reaction products, particularly isocyanuric esters which contain 6-membered heterocyclic rings and which are formed from three molecules of the monomeric isocyanate. They are formulated as:

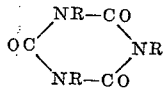

The monomers cannot be regenerated from these higher polymers and they are of no value in the many applications for which compounds containing the addition product of two isocyanate radicals are useful. Pyridine is a very much milder catalyst and large amounts of it, up to from 1 to 5 times the weight of isocyanate, are ordinarily required to catalyze the reaction. Other catalysts are known which promote the formation of compounds containing the isocyanuric ring but there have not heretofore been available any generally satisfactory catalysts for promoting the dimerization reaction with the formation of compounds containing the addition product of two isocyanate radicals.

It is an object of this invention to provide a process by which isocyanates may be converted in good yield to dimers or higher polymers which contain the addition product of two isocyanate radicals. A further object is to provide such a process which does not require careful control to prevent the formation of undesired by-products such as isocyanuric esters. Further objects will appear from the description of this invention which follows.

According to the present invention, compounds containing at least one grouping which is an addition product of two isocyanate radicals are obtained by contacting an aromatic isocyanate with a catalytic amount of a mixed aromatic-aliphatic tertiary phosphine catalyst at a temperature between 0 and 60° C. In a representative embodiment of this invention, the dimer of phenyl isocyanate is prepared by reacting phenyl isocyanate at room temperature in the presence of 0.5% by weight of phenyldimethylphosphine. The reaction may be represented as follows:

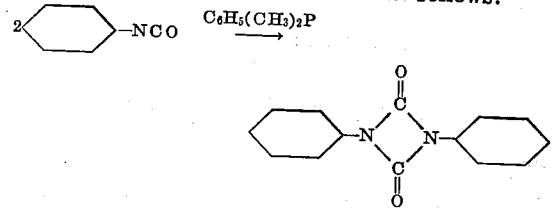

The addition product of the two isocyanate radicals is here shown as consisting of a uretidinedione ring, as has been generally assumed in the literature. There are however some indications based on the chemical reactivity of these compounds that the dimerization of an aromatic isocyanate yields a 1,3-oxazetidine ring. If this is correct, the dimer of phenyl isocyanate has the formula:

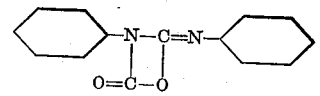

The isocyanates which may be employed in this reaction are those in which one or more isocyanate groups are attached to an organic aromatic nucleus. They include monoisocyanates such as phenyl isocyanate, tolyl isocyanates, xylyl isocyanates, naphthyl isocyanates, biphenyl isocyanates and compounds of any of these types in which the aromatic nucleus is substituted by alkyl, aryl, cycloalkyl, ester, ether, thioether, nitro or halogen groups or combinations thereof. When a monoisocyanate is employed the resulting product is invariably a dimer containing a single grouping which is an addition product of two isocyanate radicals.

The reaction may also be carried out using diisocyanates such as 2,4-toluene diisocyanate, 4-chloro-1,3-phenylene diisocyanate, 2-chloro-1,4- phenylene diisocyanate, 2-methoxy-1,4-phenylene diisocyanate and 2-nitro-1,4-phenylene diisocyanate. Other usable isocyanates include compounds such as

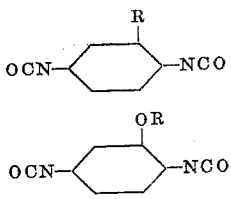

or

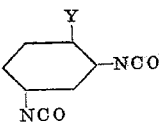

in which Y represents an ester group such as —OOCR or —COOR and in which R represents an alkyl, aryl, aralkyl or cycloalkyl group of from 1 to 10 carbon atoms. The aromatic nucleus may also be substituted with a tertiary amino group as in the compound

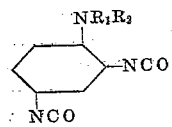

in which $R_1$ and $R_2$ represent alkyl, aryl, aralkyl or cycloalkyl groups, the total number of carbon atoms in $R_1$ and $R_2$ being from 2 to 12. Other diisocyanates containing a single phenyl group which are useful in the process of this invention are

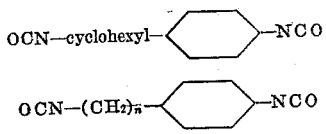

or

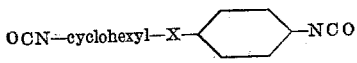

in which X represents O, S, CO, $CO_2$ or $(CH_2)_n$, and similar compounds in which X represents an alkylene group which is interrupted by a hetero atom such as oxygen, sulfur or nitrogen. In these compounds $n$ may be from 1 to 12. The diisocyanates may contain naphthyl groups as in

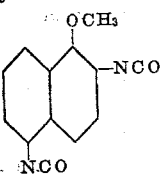

or

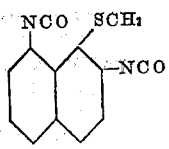

or a plurality of phenyl groups as in

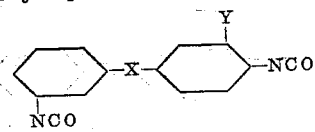

where X is O, S, CO, $SO_2$, CH=CH, —N=N, $(CH_2)_n$ or an alkylene group which is interrupted by a hetero atom such as oxygen, sulfur or nitrogen, where Y is a saturated or unsaturated hydrocarbon group, an ether group, an ester group, a tertiary amino group, —NCS, halogen or nitro, and where $n$ is from 1 to 12.

When diisocyanates are used in this reaction, the product is ordinarily a dimer containing a single grouping which is an addition product of two isocyanate radicals, but may in some cases be a higher reaction product which contains a plurality of such groupings. As in the case of 2,4-toluene diisocyanate, many of these compounds have one isocyanate group which is appreciably more reactive than the other. In such cases the reaction in the presence of the phosphine catalyst ordinarily yields a dimer containing a single grouping which is an addition product of two isocyanate radicals and free isocyanate groups. The same result is obtained when the dimer because of its physical form is quickly withdrawn from the reaction medium, as by precipitation. When the two isocyanate groups are equally reactive and when the dimer remains in available physical condition for further reaction, polymeric products will ordinarily form to some extent. Such products contain additional groupings which are addition products of two isocyanate radicals, from which the original isocyanate monomers may be regenerated if desired. These compounds are to be distinguished from undesired higher reaction products such as the isocyanuric esters which are obtained with other catalysts and from which the monomeric isocyanates may not readily be regenerated.

The reaction may be conducted with a single monomer isocyanate or with a mixture of different monomers. The reactivity of the resulting products may be varied by using a mixture of varying proportions of mono- and diisocyanates.

The mixed aromatic-aliphatic tertiary phosphine catalysts which may be used in this reaction are selected from the group consisting of $(Ar)_2AlkP$, $Ar(Alk)_2P$ and ArBivP, in which Ar represents a mononuclear aryl radical, Alk represents a lower alkyl radical and Biv represents a bivalent aliphatic radical forming with the phosphorus atom a heterocyclic ring. Suitable mononuclear aryl radicals include phenyl, tolyl, xylyl and anisyl. The most useful alkyl radicals are those containing from 1 to 6 carbon atoms, such as methyl, ethyl, propyl, isopropyl, n-butyl, isobutyl, amyl and hexyl. The bivalent aliphatic radical may for example be a tetramethylene or pentamethylene radical or such a radical containing lower alkyl substituents or olefinic unsaturation. Typical catalysts of this class include phenyldimethylphosphine, tolyldimethylphosphine, ethyldiphenylphosphine, phenyldi(n-butyl)phosphine, and 1-phenyl-3-methyl-1-phospha-3-cyclopentene. The preferred catalysts are phenyldimethylphosphine and phenyldi(n-butyl)phosphine.

The reaction is most conveniently carried out at room temperature but may be successfully conducted at temperatures between 0 and 60° C. or in some cases at somewhat higher temperatures. The preferred range is from 20 to 40° C. At lower temperatures, the reaction becomes undesirably slow, while at higher temperatures it becomes increasingly difficult to control and there is a tendency to form undesired products such as the isocyanuric esters.

Ordinarily the catalyst will be used in amounts equal to from 0.1 to 10% by weight based on the amount of isocyanate. Higher amounts of catalyst do no harm but are unnecessary. The preferred addition of catalyst is from 0.2 to 2% by weight. In case the isocyanate contains small amounts of phosgene as impurity, it is necessary to use somewhat more catalyst, as the phosgene exerts an inhibiting effect.

With the catalysts of this invention, it is not difficult to control the temperature of the reaction within the proper operating limits. The reaction of the isocyanate to form the dimer is exothermic and in some cases cooling will be necessary. In such cases it is frequently possible to select a catalyst having somewhat lower activity which will produce a smaller heat evolution. In general the phosphines containing two aryl groups and those having a higher overall molecular weight are somewhat less active than the lower members of the group such as phenyldimethylphosphine.

The process may be operated in the absence of a solvent or in the presence of a solvent which is free from active hydrogen atoms which might react with the isocyanates. Operable solvents include benzene, chlorinated benzenes, nitrobenzene, dioxane, aliphatic hydrocarbons, solvent naphthas and the like. The use of a solvent is often helpful in producing a smooth reaction and also in the working up of the product. The solvent may be recovered by conventional procedures and recycled to the process. The products of the reaction are obtained as solids which are generally crystalline and which may readily be removed from the reaction medium by filtration. They are washed and in some cases recrystallized in conventional manner to give material of good quality at high yield. Care must be exercised to avoid temperatures above about 100° C.

This invention is illustrated by the following examples, in which parts are by weight:

Example 1

About 0.05 part of the catalyst phenyldimethylphosphine is added to 10 parts of phenyl isocyanate at room temperature. Soon after the addition of the catalyst, the liquid mass begins to warm up and after 1–2 hours has solidified completely to a crystalline mass. The crystals thus obtained are slurried under agitation with 15 parts of carbon tetrachloride, filtered and dried to give 10 parts of the crude phenyl isocyanate dimer which melts at 174–175° C.

The crude phenyl isocyanate dimer after recrystallization from either benzene, ethyl acetate, nitrobenzene or pyridine melts at 175° C., which is the melting point reported in the literature.

Using the same procedure but substituting the following catalysts for the phenyldimethylphosphine gives the following crude yields of the phenyl isocyanate dimer:

| Catalyst | Yield of dimer, percent |
| --- | --- |
| 4-Tolyldimethylphosphine, $CH_3-C_6H_4-P-(CH_3)_2$ | 92 |
| 2,5-Xylyldimethylphosphine, $(CH_3)_2-C_6H_3-P-(CH_3)_2$ | 84 |
| 4-Anisyldimethylphosphine, $CH_3O-C_6H_4-P-(CH_3)_2$ | 96 |
| Phenyldi(n-butyl)phosphine, $C_6H_5-P-(C_4H_9)_2$ | 85 |
| Diphenylethylphosphine, $(C_6H_5)_2P-C_2H_5$ | 62 |

Example 2

To a solution of 5 parts of phenyl isocyanate in 5 parts by volume of nitrobenzene, 0.04 part of the catalyst phenyldimethylphosphine is added at room temperature. Within a half hour after the addition of the catalyst, crystals of the dimer begin to separate out. The crystals thus formed are allowed to stand overnight at room temperature and are then filtered off, washed with 20 parts by volume of carbon tetrachloride and dried. The crude phenyl isocyanate dimer thus prepared is obtained in the form of large plates melting at 174–175° C. in a yield of 4.3 parts or 86%.

Using this same procedure but substituting for the nitrobenzene solvent each of the solvents monochlorobenzene, dichlorobenzene, benzene, heptane and isooctane, excellent yields of the phenyl isocyanate dimer are obtained. Using these other solvents in the same procedure, all of the catalysts of Example 1 give similarly good results.

Example 3

To a solution of 2 parts of 4-nitrophenyl isocyanate in 20 parts of dioxane, 0.05 part of the catalyst phenyldimethylphosphine is added at room temperature. Soon after the addition of the catalyst, which causes a somewhat vigorous reaction, crystals of the 4-nitrophenyl isocyanate dimer begin to crystallize out. The crystals thus formed are allowed to stand for 2 hours at room temperature and are then filtered off and washed with dioxane and carbon tetrachloride to give a crude yield of 1.5 parts of the 4-nitrophenyl isocyanate dimer.

The crude 4-nitrophenyl isocyanate dimer after one recrystallization from nitrobenzene is obtained in long white felted needles, which melt at 208–210° C. The yield of the purified 4-nitrophenyl isocyanate dimer is 1.2 parts, or 60% of theory.

Example 4

About 0.03 part of the catalyst phenyldimethylphosphine is added to 10 parts of 2,4-toluene diisocyanated at room temperature. Within three minutes after the addition of the catalyst, the reaction mass begins to warm up and crystals of the dimer of 2,4-toluene diisocyanate separate out. After standing overnight at room temperature, the solid crystalline mass is slurried by agitating for a short time with 50 parts by volume of carbon tetrachloride, filtered and dried. The yield of the crude dimer of 2,4-toluene diisocyanate thus obtained is 8.5 parts or 85% of theory.

After one recrystallization from ethyl acetate the product is obtained in the form of beautiful plates which melt at 158° C.

Excellent yields of the dimer of 2,4-toluene diisocyanate are also obtainable using the solvent phase method as described in Example 2.

Example 5

To a solution containing 2 parts by weight of 4,4'-biphenylene diisocyanate and 1 part by weight of phenyl isocyanate in 10 parts by volume of orthodichlorobenzene is added 0.04 part of the catalyst phenyldimethylphosphine at room temperature. Five minutes after the addition of the catalyst a precipitate begins to separate out. After standing for 24 hours this is filtered off, slurried at the boil with hexane, filtered while hot and dried. The product is a pale yellow amorphous substance which melts with decomposition at 325° C. It weighs 1.8 parts. This substance, after refluxing with about 25 parts by weight of absolute alcohol for 8 hours, gives the monoethyl urethane which melts with decomposition at 280° C. and is believed to correspond to the formula:

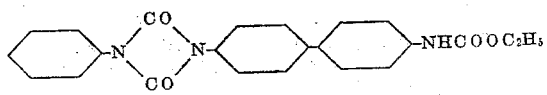

assuming that the addition product of two isocyanate radicals is a uretidinedione ring.

Example 6

To a solution of 5 parts by weight of phenyl isocyanate in 5 parts by weight of dried benzene is added 0.06 part of 1-phenyl-3-methyl-1-phospha-3-cyclopentene corresponding to the formula:

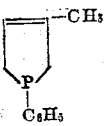

Soon after the addition of the catalyst, a small amount of the dimer of phenyl isocyanate begins to separate out. The reaction mixture is cooled and filtered immediately, giving a filter cake which is washed and dried as described above and found to be identical with the dimer product of Example 1.

Example 7

The procedure described in Example 1 is repeated using the isocyanates indicated below. In each case the catalyst used is phenyldimethylphosphine. The melting points of the dimers are as follows:

| Isocyanate | Solvent | Melting range, ° C. |
|---|---|---|
| 4-Bromophenyl | benzene | 187–92 |
| 4-Ethoxyphenyl | do | 171–75 |
| 2,5-Dichlorophenyl | do | 233–40 |
| beta-Naphthylphenyl | do | 194–99 |
| 2-Chlorophenyl | no solvent | 218–19 |
| 3-Chlorophenyl | benzene | 171–72 |
| 3-Nitrophenyl | do | 182–84 |
| 4-Chlorophenyl | no solvent | 172–74 |

Example 8

A mixture of 30 parts of p-dodecylphenyl isocyanate, 15 parts of pyridine and 1 part of phenyldimethylphosphine is allowed to stand for 2 hours at room temperature. The resulting product is filtered and the white crystalline solid which is filtered off is washed with approximately 15 parts of carbon tetrachloride. Upon recrystallization of this white crystalline solid a product is obtained which has a melting point of 118° C. The product as originally precipitated and washed with carbon tetrachloride is substantially pure, having a melting point of 117° C.

The process of this invention provides a simple and convenient method for obtaining compounds containing the addition product of two isocyanate radicals in good yield and without appreciable formation of undesired by-products. When the resulting compounds contain no free isocyanate groups, they are resistant to moisture and may be handled and stored for extended periods without special precautions or deterioration. Products prepared from diisocyanates, which products ordinarily contain free isocyanate groups, may be further reacted with other compounds to form additional stable products containing the grouping which is an addition product of two isocyanate radicals. The monomeric isocyanates may be regenerated from these compounds by thermal decomposition. The products prepared according to this invention therefore represent a convenient means of storing the active and volatile isocyanates. These products are also useful as intermediates in the preparation of adhesives and other surface treating agents.

I claim:

1. A process of preparing a compound containing at least one grouping which is an addition product of two isocyanate radicals which comprises contacting an aromatic isocyanate with from 0.1 to 10% by weight of a mixed aromatic-aliphatic tertiary phosphine catalyst selected from the group consisting of $(Ar)_2AlkP$, $Ar(Alk)_2P$ and $ArBivP$ in which Ar represents a mononuclear aryl radical, Alk represents a lower alkyl radical and Biv represents a bivalent aliphatic radical forming with the phosphorus atom a heterocyclic ring, at a temperature between 0 and 60° C.

2. A process according to claim 1 in which the aromatic isocyanate is phenyl isocyanate.

3. A process according to claim 1 in which the aromatic isocyanate is a diisocyanate.

4. A process according to claim 1 in which the aromatic isocyanate is 2,4-toluene diisocyanate.

5. A process according to claim 1 in which the tertiary phosphine catalyst is a phenyldialkylphosphine in which the alkyl groups contain from 1 to 6 carbon atoms.

6. A process according to claim 1 in which the tertiary phosphine catalyst is phenyldimethylphosphine.

7. A process according to claim 1 in which the tertiary phosphine catalyst is phenyldi(n-butyl)phosphine.

8. A process of preparing a dimer of an organic compound, said compound containing a single isocyanate group attached to an aromatic ring, which comprises contacting the said organic compound with from 0.1 to 10% by weight of a mixed aromatic-aliphatic tertiary phosphine catalyst selected from the group consisting of $(Ar)_2AlkP$, $Ar(Alk)_2P$ and $ArBivP$, in which Ar represents a mononuclear aryl radical, Alk represents a lower alkyl radical and Biv represents a bivalent aliphatic radical forming with the phosphorus atom a heterocyclic ring, at a temperature between 0 and 60° C.

9. A process of preparing a dimer of an organic compound, said compound containing a single isocyanate group attached to an aromatic ring, which comprises contacting the said organic compound with from 0.1 to 10% by weight of a phenyldialkylphosphine in which the alkyl groups contain from 1 to 6 carbon atoms, at a temperature between 0 and 60° C.

10. A process of preparing the dimer of phenyl isocyanate which comprises contacting phenyl isocyanate with from 0.1 to 10% by weight of phenyldimethylphosphine at a temperature between 0 and 60° C.

11. A process of preparing a compound containing at least one grouping which is an addition product of two isocyanate radicals which comprises contacting an aromatic diisocyanate with from 0.1% to 10% by weight of phenyldimethylphosphine at a temperature between 0 and 60° C.

12. A process of preparing a dimer of 2,4-toluene diisocyanate which comprises contacting the said compound with from 0.1 to 10% by weight of phenyldimethylphosphine at a temperature between 0 to 60° C.

13. A process of preparing a compound containing at least one grouping which is an addition product of two isocyanate radicals which comprises contacting an aromatic diisocyanate with from 0.1 to 10% by weight of phenyldi(n-butyl)phosphine at a temperature between 0 and 60° C.

14. A process of preparing a dimer of 2,4-toluene diisocyanate which comprises contacting the said compound with from 0.1 to 10% by weight of phenyldi(n-butyl)phosphine at a temperature between 0 and 60° C.

OTTO STALLMANN.

References Cited in the file of this patent

UNITED STATES PATENTS

| Number | Name | Date |
|---|---|---|
| 2,520,601 | Lee | Aug. 29, 1950 |

OTHER REFERENCES

Hoffman, Ber. Deut. Chem., vol. 4, pp. 246–51 (1871).